(12) United States Patent
Dixon

(10) Patent No.: US 8,905,418 B2
(45) Date of Patent: Dec. 9, 2014

(54) MOUNTING ASSEMBLY FOR VEHICLE MUD FLAPS

(75) Inventor: Ian A. Dixon, Nashville, TN (US)

(73) Assignee: Fontaine Spray Suppression Company, Springfield, TN (US)

( * ) Notice: Subject to any disclaimer, the term of this patent is extended or adjusted under 35 U.S.C. 154(b) by 124 days.

(21) Appl. No.: 13/480,580

(22) Filed: May 25, 2012

(65) Prior Publication Data

US 2012/0298814 A1 Nov. 29, 2012

Related U.S. Application Data

(60) Provisional application No. 61/489,980, filed on May 25, 2011.

(51) Int. Cl.
*B62D 25/18* (2006.01)

(52) U.S. Cl.
CPC .................................. *B62D 25/188* (2013.01)
USPC ............................................. 280/154; 24/535

(58) Field of Classification Search
CPC .. B62D 25/188; B62D 25/182; B62D 25/186; B62D 25/163; B62D 25/168; B62D 25/18; B60R 11/00
USPC ............. 24/535; 280/154, 851, 847, 848, 188
See application file for complete search history.

(56) References Cited

U.S. PATENT DOCUMENTS

| | | | | |
|---|---|---|---|---|
| 4,505,010 A | * | 3/1985 | Arenhold | 24/456 |
| 5,823,571 A | * | 10/1998 | Cominsky | 280/847 |
| 5,833,254 A | * | 11/1998 | Bucho | 280/154 |
| 5,938,222 A | * | 8/1999 | Huang | 280/154 |
| 5,967,553 A | * | 10/1999 | Cominsky | 280/847 |
| 6,135,502 A | * | 10/2000 | Howe et al. | 280/847 |
| 6,994,376 B1 | * | 2/2006 | Deering et al. | 280/847 |
| 7,040,662 B2 | * | 5/2006 | Barr et al. | 280/847 |
| 7,226,086 B2 | * | 6/2007 | Haynes | 280/851 |
| 7,578,526 B2 | * | 8/2009 | Jaeger | 280/848 |
| 7,607,698 B2 | * | 10/2009 | Cicansky | 280/851 |
| 7,654,574 B2 | * | 2/2010 | Haynes | 280/851 |
| 8,191,843 B2 | * | 6/2012 | Hagino et al. | 248/222.14 |
| 8,579,314 B2 | * | 11/2013 | Prazen et al. | 280/154 |
| 2004/0164540 A1 | * | 8/2004 | Drummond | 280/851 |
| 2005/0212282 A1 | * | 9/2005 | Markham | 280/851 |
| 2008/0185809 A1 | * | 8/2008 | Archer et al. | 280/154 |
| 2008/0185810 A1 | * | 8/2008 | Archer et al. | 280/154 |
| 2009/0256344 A1 | * | 10/2009 | Mahoney | 280/848 |
| 2013/0193300 A1 | * | 8/2013 | Eklund et al. | 248/610 |
| 2013/0256483 A1 | * | 10/2013 | Dixon | 248/222.14 |

\* cited by examiner

*Primary Examiner* — Bradley Duckworth

(74) *Attorney, Agent, or Firm* — DLA Piper LLP (US); R. Blake Johnston

(57) ABSTRACT

A mounting assembly for mud flaps has an elongated mounting arm defining an interior elongated chamber with a slot opening at the bottom. The assembly includes a one or more biased clips that attach to the top edge of the mud flap, which is inserted into the chamber with the lower portion of the mud flap extending through the bottom slot and the clips seated within the chamber. The clips include a pair of protrusions that engage the interior of the chamber, and are configured such that sufficient downward force on the mud flap causes the clip to open and release the mud flap.

25 Claims, 8 Drawing Sheets

MOUNTING ASSEMBLY FOR VEHICLE MUD FLAPS

BACKGROUND

1. Field of the Invention

This invention relates to an assembly for securing mud flaps to vehicles.

2. Description of Problem

Many commercial trucks, tractors, and trailers are equipped with mud flaps to mitigate the spray from wet roads, and to reduce the ejection of stones and road debris. The mud flaps are generally mounted behind the tires, measure about 24 inches wide, and extend to approximately 5 inches above the road. Many States in the U.S. have laws that require mud flaps or other devices, and equipment citations for improper or worn mud flaps are issued. There is also an increased liability risk for a vehicle travelling with a missing mud flap if stones or debris damage another vehicle.

The mud flaps are generally secured in close proximity to the wheels of a vehicle. It is relatively common for a mud flap to become trapped between the wheels of a vehicle and a curb or other ground structure when the vehicle is traveling in reverse. This can result in a bent or broken mud flap mounting arm, a torn mud flap, or other equipment damage, as well as a vehicle with no mud flap.

Drivers frequently do not carry replacement mud flaps, or the tools necessary to replace them. Therefore, a service call may be necessary to replace a missing mud flap, which is not only expensive but also delays the vehicle. Alternatively, the vehicle may travel to a repair facility. A repair facility charges for its services, delays the vehicle while the repairs are made, and may require the vehicle to travel out of its planned route.

Delays for many delivery vehicles will reduce profits. Delivery delays may be reduced by using a releasable mud flap mounting system that secures the mud flap to the vehicle during normal use, but releases the mud flap without causing damage if the mud flap becomes caught between the wheels and an object on the ground. The driver can then simply re-connect the mud flap, or replace the mud flap with a spare, and continue with the delivery.

SUMMARY

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

A mud flap mounting system has an elongated mounting arm with an elongated chamber having slot opening in the bottom of the chamber. A clip has two lever members that pivot about a common hinge with ends that are biased together with a biasing member. The lever members engage either face of a mud flap at the top edge and provide a suspension attachment for the mud flap when the thus-clipped assembly is inserted into the chamber with the mud flap extending through the slot.

Clips comprise a width sufficient to engage either side of the slot and suspend the mud flap from the arm.

In one embodiment, the clip width includes protrusions which are seated within the chamber on either side of the slot, but are configured such that a sufficient downward force on the mud flap will transfer an upward force acting on the protrusions, causing the lever members to open and release the mud flap to prevent damage.

In another embodiment, the mounting arm has an open top through which the mud flap assembly may be inserted.

In yet another embodiment, the mounting arm comprises a tubular structure with an open outward end, with respect to the vehicle on which the assembly is installed, through which the mud flap and clips are inserted.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements.

DETAILED DESCRIPTION

Figure 1:
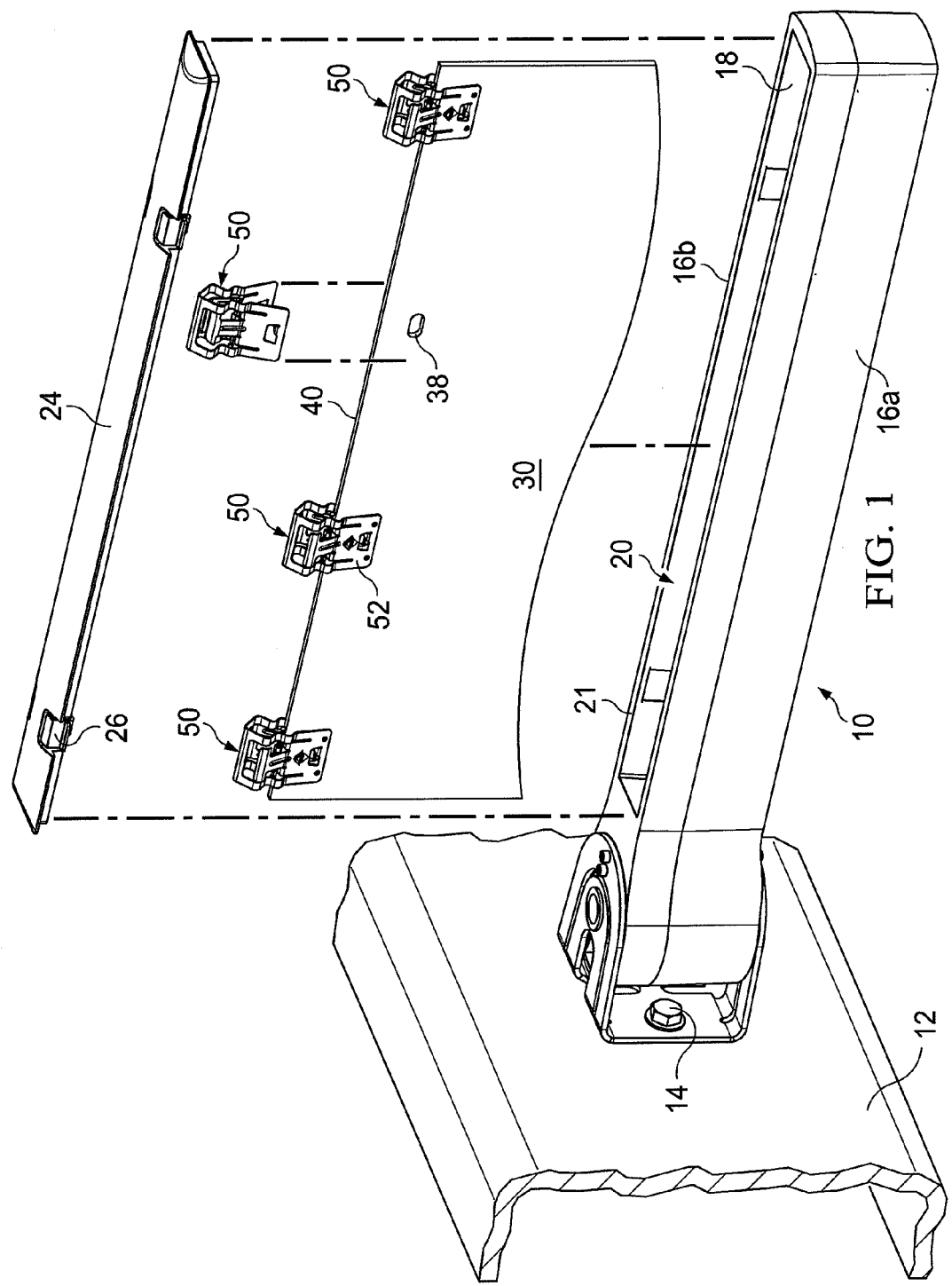
FIG. 1 is a partially exploded perspective view of one exemplary embodiment of the mud flap mounting system.

The various embodiments of the present invention and their advantages are best understood by referring to FIGS. 1 through 14 of the drawings. The elements of the drawings are not necessarily to scale, emphasis instead being placed upon clearly illustrating the principles of the invention. Throughout the drawings, like numerals are used for like and corresponding parts of the various drawings.

This invention may be provided in other specific forms and embodiments without departing from the essential characteristics as described herein. The embodiments described above are to be considered in all aspects as illustrative only and not restrictive in any manner. The appended claims, rather than the following description indicate the scope of the invention.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

Unless otherwise indicated, terms such as "aft," "rear," "forward," "front," "lateral," or "outward," or the like, and derivatives thereof are to be understand in relation to the truck or vehicle on which the fifth wheel is mounted. On the other hand, rotational terms such as "clockwise" and "counterclockwise" are to be understood as viewed in the figure(s) referenced in the detailed description. However, it is to be understood that the invention may assume various alternative orientations, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

A vehicle, such as a semi truck and trailer, a pick-up truck, a van, or many other types of vehicles may utilize mud flaps to reduce the amount of material the tires throw into other vehicles. The mud flaps are typically hung behind the rear wheels of the vehicle, or the rear wheels of a trailer, and may also be hung behind other wheels of the vehicle or trailer. A releasable mud flap mounting system secures the mud flap to the vehicle during normal use, but releases the mud flap when sufficient downward force is applied. The mud flap is released before the downward force damages the mud flap, or the hardware used to hang the mud flap behind the wheels. The mud flap can then be collected and re-hung, or a replacement mud flap can be used.

Mounting Arm

Figure 2:
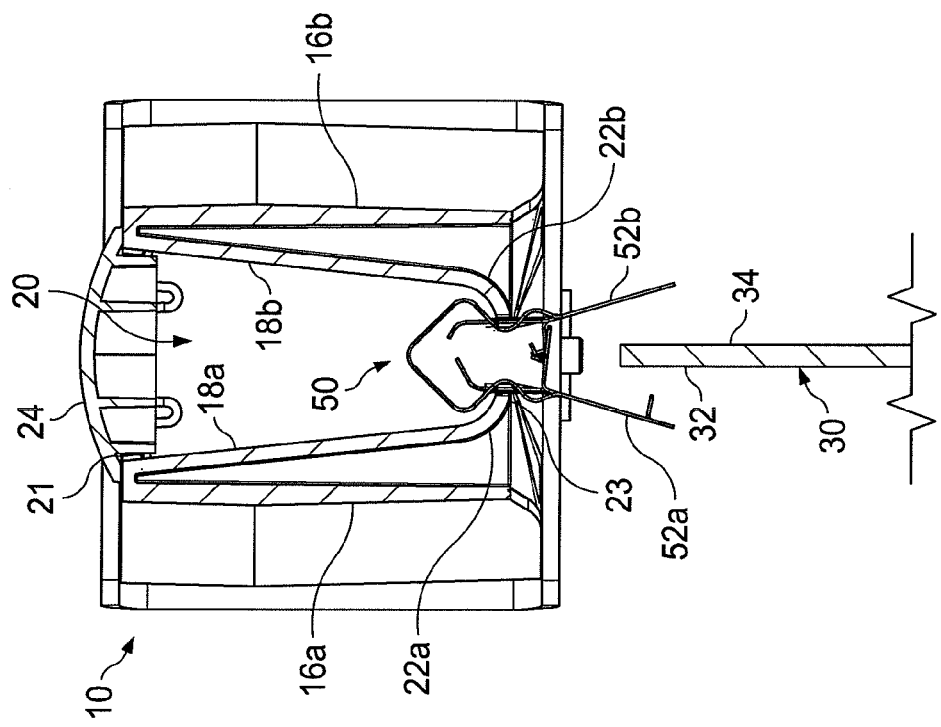
FIG. 2 is side cross sectional view of one embodiment of the mud flap mounting system, with the mud flap secured in the clip.
Figure 3:
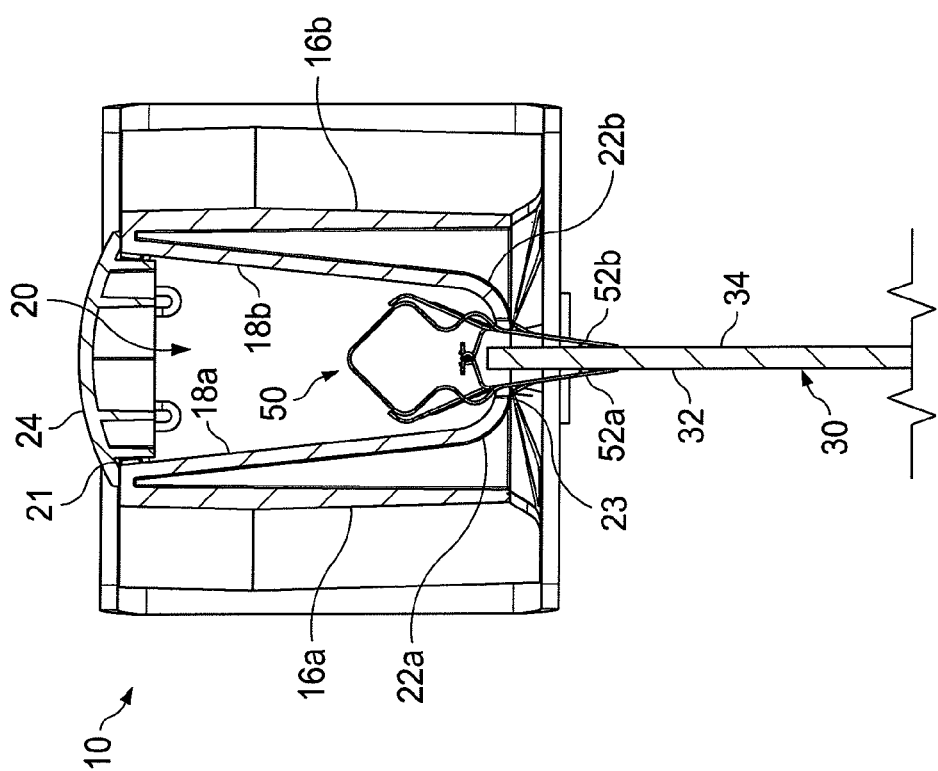
FIG. 3 is a side cross sectional view of one embodiment of the mud flap mounting system, with the clip releasing the mud flap.

With reference to FIGS. 1 through 3, assembly the mounting arm 10 is connected to a vehicle frame member 12 such that the mounting arm 10 is positioned behind and slightly above the wheels of the vehicle and extending laterally therefrom. The frame member 12 can be a truck, trailer, van, tractor, or any of a wide variety of vehicles. The mounting arm 10 can be connected to the frame member 12 with mounting bolts 14, but many other connection techniques can be used, including but not limited to welding, screws, or the use of bracket.

The laterally extending mounting arm 10 is comprised of two generally parallel, spaced-apart walls 16a, 16b extending outward to define an elongated chamber 20 between them with an open top slot 21 and bottom slots 23. Each of the walls 16a, b has an interior opposing surface 18a, b. This interior surface 18a, b can be angled, such that the width of the chamber 20 tapers from the top to the bottom such that the chamber 20 is wider near the top slot 21 than it is near the bottom slot 23.

Each wall 16a, 16b can also include a lip 22a, 22b, which tend inward toward each other and define the bottom slot 23. The lips 22a, b can be the top edge of the walls 16, if the interior surfaces 18a, b of the walls 16a, 16b that face together are vertical such that the chamber 20 has a constant width. In some embodiments, the lips 22a, b may extend generally horizontally. The chamber 20 width is preferably dimensioned such that a mud flap slides through the bottom slot 23 with a limited, controlled tolerance to restrict mud flap oscillation.

In a preferred embodiment, the walls 16a, 16b are connected to each other at each of their corresponding ends resulting in greater structural support. In other embodiments, the walls 16a, 16b are not connected at laterally outward end in order to mount and support wider mud flaps between the walls 16. In this embodiment, the larger mud flaps may, therefore, extend beyond the end of the walls 16.

The mounting arm 10 can also include a cap 24 to cover the chamber 20. The cap 24 can keep mud, dirt, and debris out of the chamber 20, which can reduce wear and tear. Rocks or other debris can become wedged or pinched within the chamber 20, and grind or wear on the parts within the chamber 20 as the vehicle moves and bounces about. The cap 24 can be secured over the chamber 20 with latches 26, but a wide variety of different connection devices can be used, including but not limited to bolts, screws, fitted connections, or straps.

Mud Flap

Figure 4:
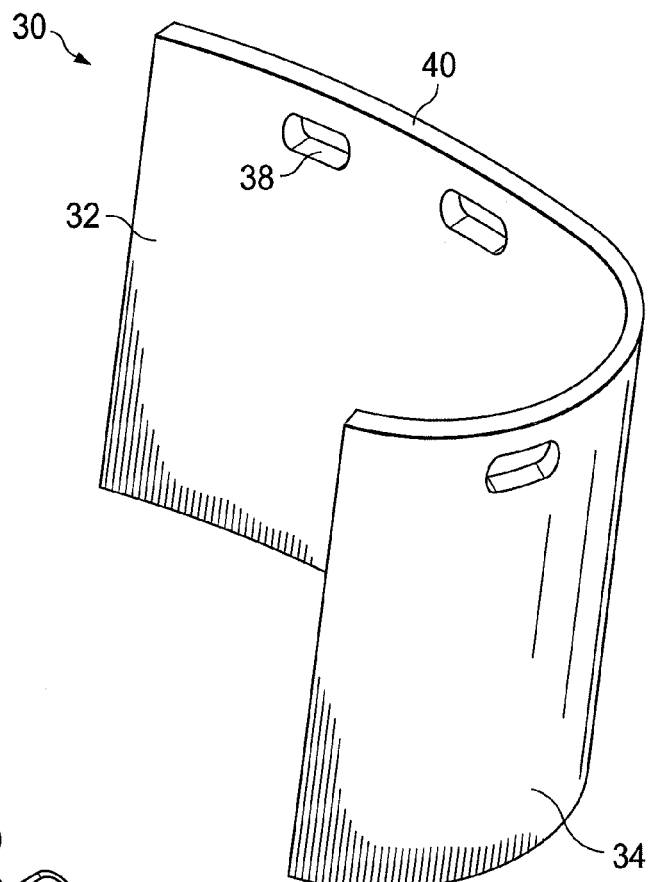
FIG. 4 is a perspective view of a mud flap.

The mud flap 30 is generally a pliable, sturdy material, as is known in the art, or may be hereafter developed for the application described herein, and is suspended from the mounting arm 10. The mud flap 30 has a front face 32 and a rear face 34, as seen in FIG. 4. In one embodiment, the mud flap 30 comprises one or more mounting holes 38 extending through the mud flap 30 from the front 32 to the rear face, 34 and disposed in the upper half of the mud flap 30, each hole 38 preferably at the same distance from the top edge 40 of the flap. As will be described in greater detail below, the holes 38 provide attachment points suitable for suspending the mud flap 30 from the mounting arm 10.

Some mud flaps have an angled top edge 40, such that at least one corner of the top edge 40 is angled with the remaining portion of the top edge 40 being horizontal. In this case, the angled portion of the mud flap top edge 40 can also include mounting holes 38, however it is also possible to omit mounting holes from the angled portion of the mud flap 30. The horizontal portion of an angled mud flap top edge 40 can also include mounting holes 38. For mud flaps 30 with an angled top edge 40, the walls 16a, 16b may comprise an angle that matches the angle of the mud flap top edge 40, or the angled portion of the top edge 40 can protrude from the bottom of the mounting arm 10 without any attachment to the mounting arm 10. Consequently, it will be recognized that the mud flap mounting system of this description does not require direct support at every mounting hole 38.

Clip

With reference to FIGS. 5 through 8, a clip 50 is used to suspend the mud flap 30 from the mounting arm 10, and comprises a opposing lever members 52a, b, that share a common hinge 62, acting as a fulcrum located between the ends of each opposing lever member 52 so that at one set of corresponding ends of each lever member 52 are not connected to each other, "opening ends," and may be forced apart by forcing together corresponding opposing ends of the lever members 52a, b. These corresponding opening ends of the lever members 52 are biased toward each other with a biasing member 70, which may be a spring member, a coiled spring member or the like. The lever members 52a, b comprise mutually opposing contact surfaces 54a, b.

As shown in the Figures, clip 50 is installed on the mud flap 30 such that contact surfaces 54a, b engage both faces 32, 34 of the mud flap 30. In one embodiment, either, or both, of the opposing contact surfaces 54a, b, may be configured with a protruding tab 58 insertable into the mounting hole 38 in the mud flap 30.

The lever member 52 may be generally planar, but may also be configured to comprise contact surfaces 54a, b, that are rough, including an undulated surface, or a ridged surface, in essence a non-smooth surface in order to enhance the gripping contact on the mud flap faces 32, 34. Further, the contact surfaces 54 can comprise one or more catch teeth 60 to grip the mud flap faces 32, 34, or may comprise a polymeric material having a surface with adequate friction coefficient to suspend the mud flap 30.

Figure 5:
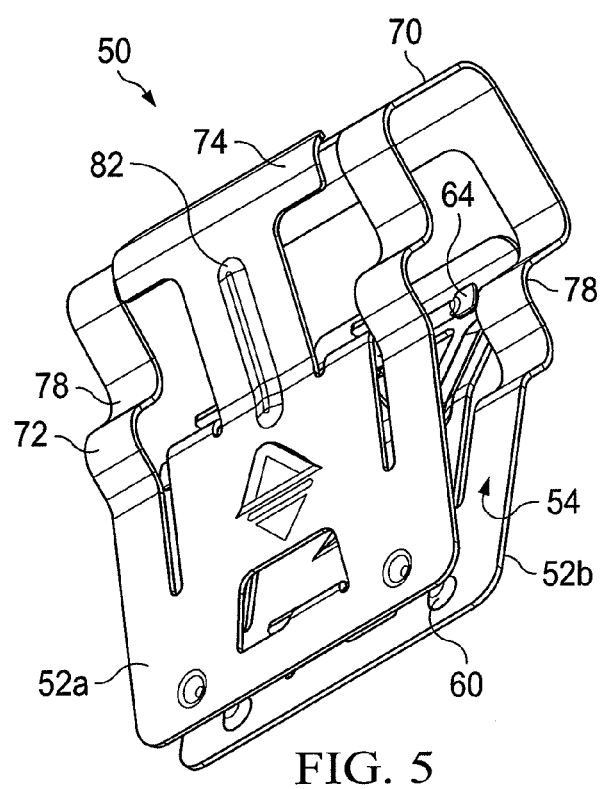
FIG. 5 is a lower perspective view of one embodiment of the clip.
Figure 6:
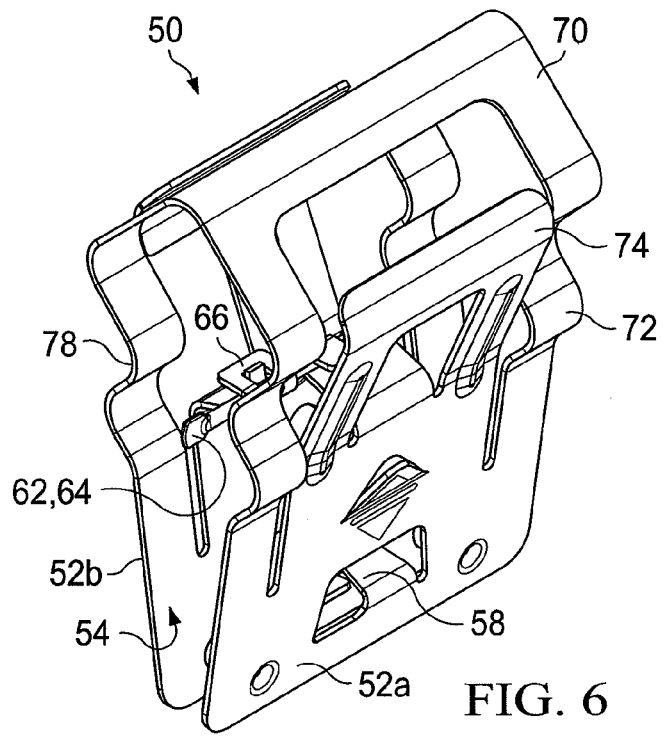
FIG. 6 is an upper perspective view of one embodiment of the clip.
Figure 7:
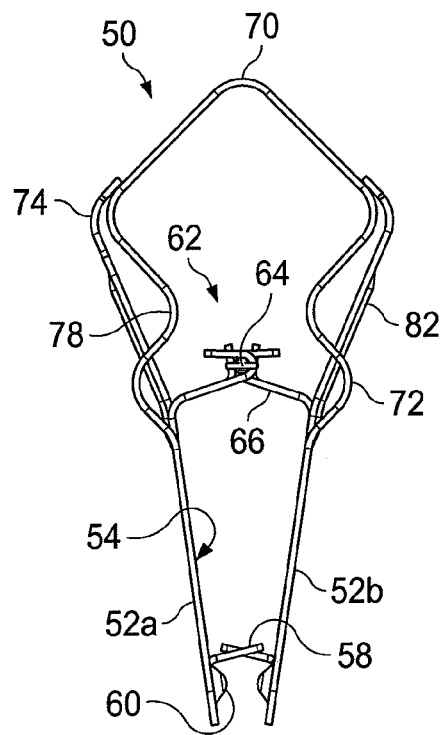
FIG. 7 is a side view of one embodiment of the clip.
Figure 8:
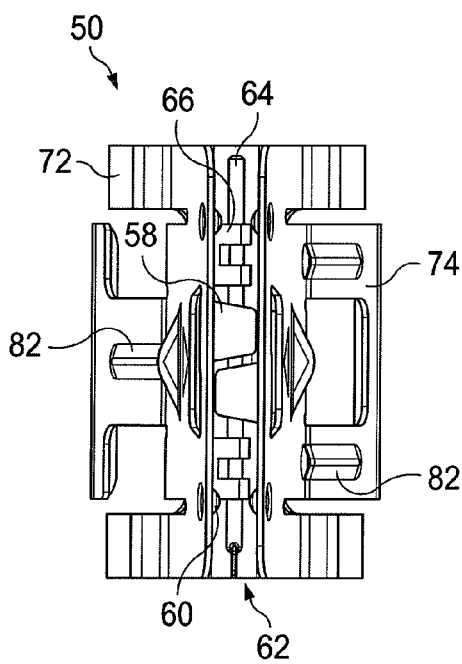
FIG. 8 is a bottom view of one embodiment of the clip.
Figure 9:
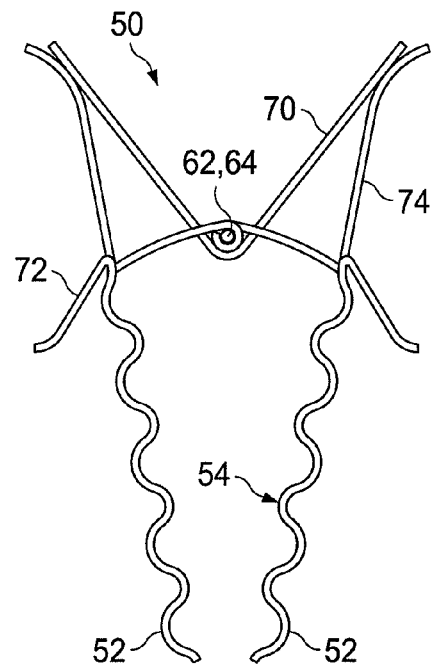
FIG. 9 is a side view of an alternate embodiment of the clip.
Figure 10:
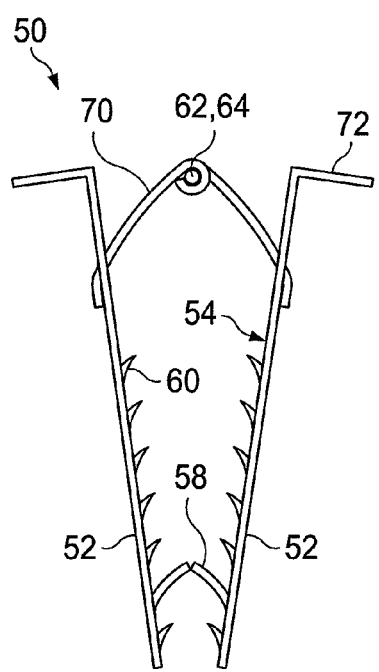
FIG. 10 is a side view of yet another alternate embodiment of the clip.
Figure 11:
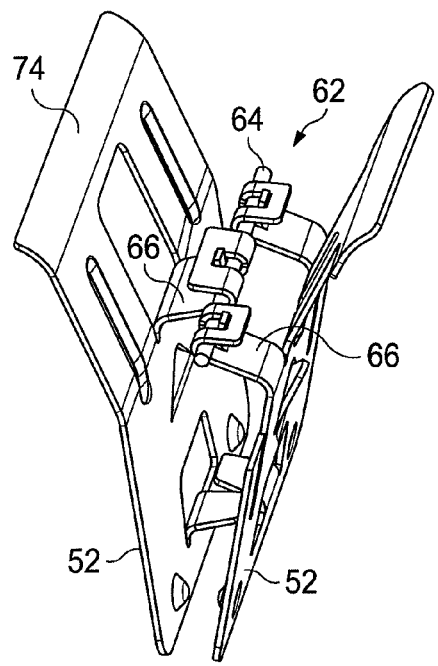
FIG. 11 is a partial perspective view of the hinge in one embodiment of the clip.

The biasing member 70 can be formed integrally with the lever members 52a, b, as illustrated in FIGS. 5 and 6, or may be a separate component as shown in FIGS. 9 and 10. Additionally, it will be appreciated that the hinge 62 may be achieved with a living hinge, or with a pin-and-barrel arrangement, or any variation thereof, using, by way of non-limiting example, curled tabs 66 extending from respective lever members 52 to provide pivoting engagement of each lever member 52 with a common hinge pin 64. In one version, the clip 50 comprises tabs 74 divergently extending away from the contact surfaces 54a, b, for manually opening the lever members 52 by squeezing the two opposed tabs 74 together.

Advantageously, in a preferred embodiment the clip 50 comprises protrusions 72 extending from both lever members 52a, b, to a distance that increases the overall width of the clip 50 such that, although the lever members 52a, b with a mud flap 30 installed between them will pass through the bottom slot 23 of the mounting arm 10, the protrusions 72 will engage each lip 22.

In one embodiment, protrusions 72 act as a quick release counter-lever, in the event a mud flap 30 is trapped by a vehicle wheel and strong downward force is applied to the mud flap 30. This downward force is transferred to the protrusions 72, seated on the lips 22a, b. When sufficient force is applied, the protrusions 72 are forced generally upward, forcing the lever members 52a, b apart and releasing the mud flap 30. Accordingly, the clip 50 should be formed such that protrusions 72 extend away from respective lever members 52, at an angle that tends toward the open ends, as illustrated in FIGS. 9 & 10.

In an alternate embodiment, the lever member 52 comprises a trap 78 having a depth extending toward the interior of the clip 50 beyond the width defined by the lever member 52 and intermediate the open end of clip and the hinge 64. In this embodiment, the protrusions 72 are preferably formed from of a deformable, resilient material, so that in the event the mud flap 30 is forcefully pulled downward and the protrusions 72 can be compressed and allowed through the bottom slot 23 but return to their initial width after passage. The edges of each lip 22 will then engage the trap 78, so the entire clip 50 will remain lodged in the chamber 20 at a slightly lower position.

The tab 74 can be designed and positioned such that the tab 74 is compressed when the trap 78 engages the lip 22a, b, thereby urging the lever members 52a, b open. The tab 74 can include additional material 82 extending away from the tab surface to increase leverage, enhance compression of the tab 74, resulting in faster opening of the lever members 52a, b.

Figure 12:
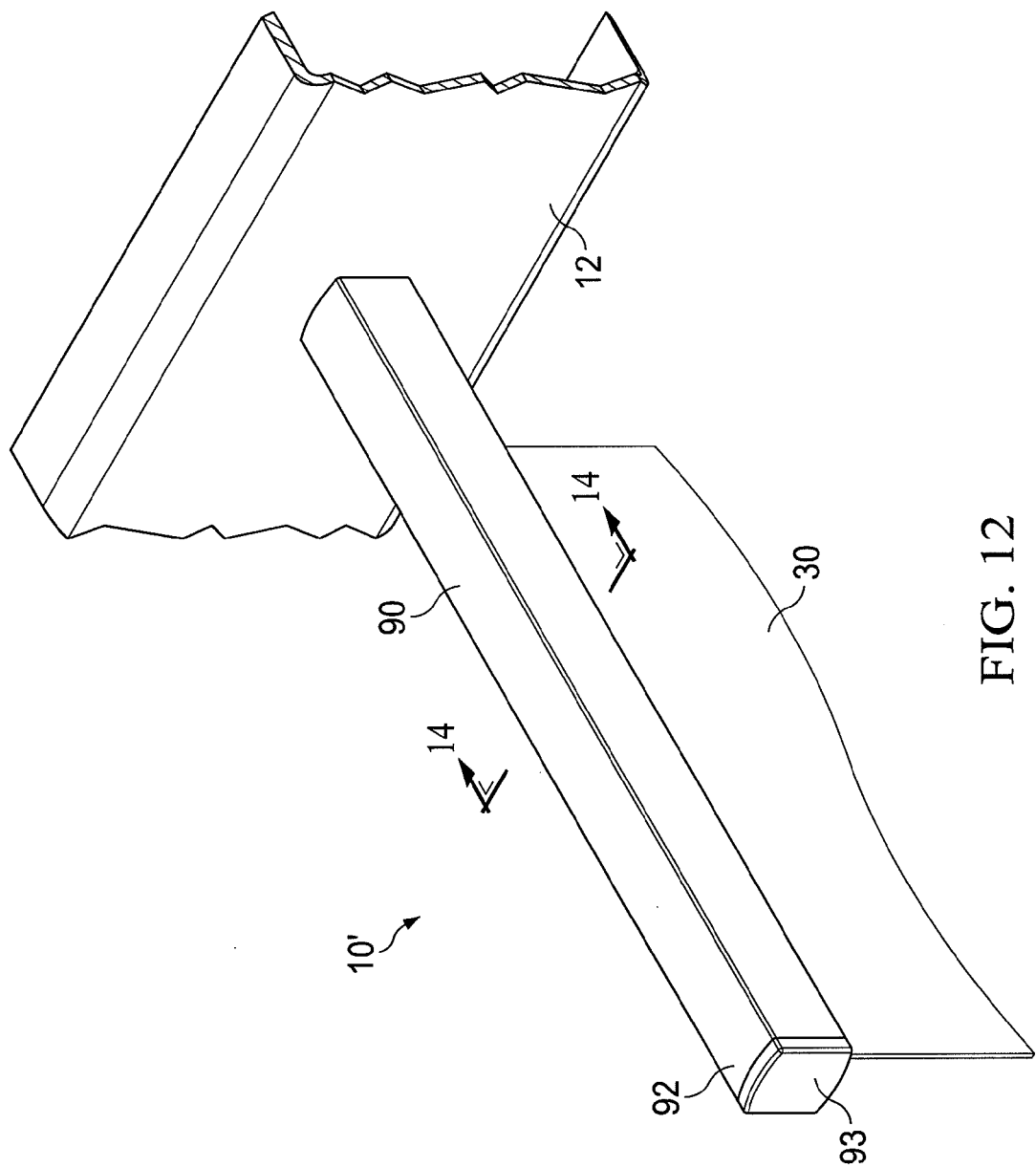
FIG. 12 is a perspective view of a further exemplary embodiment of a mounting assembly for a vehicle mud flap.
Figure 13:
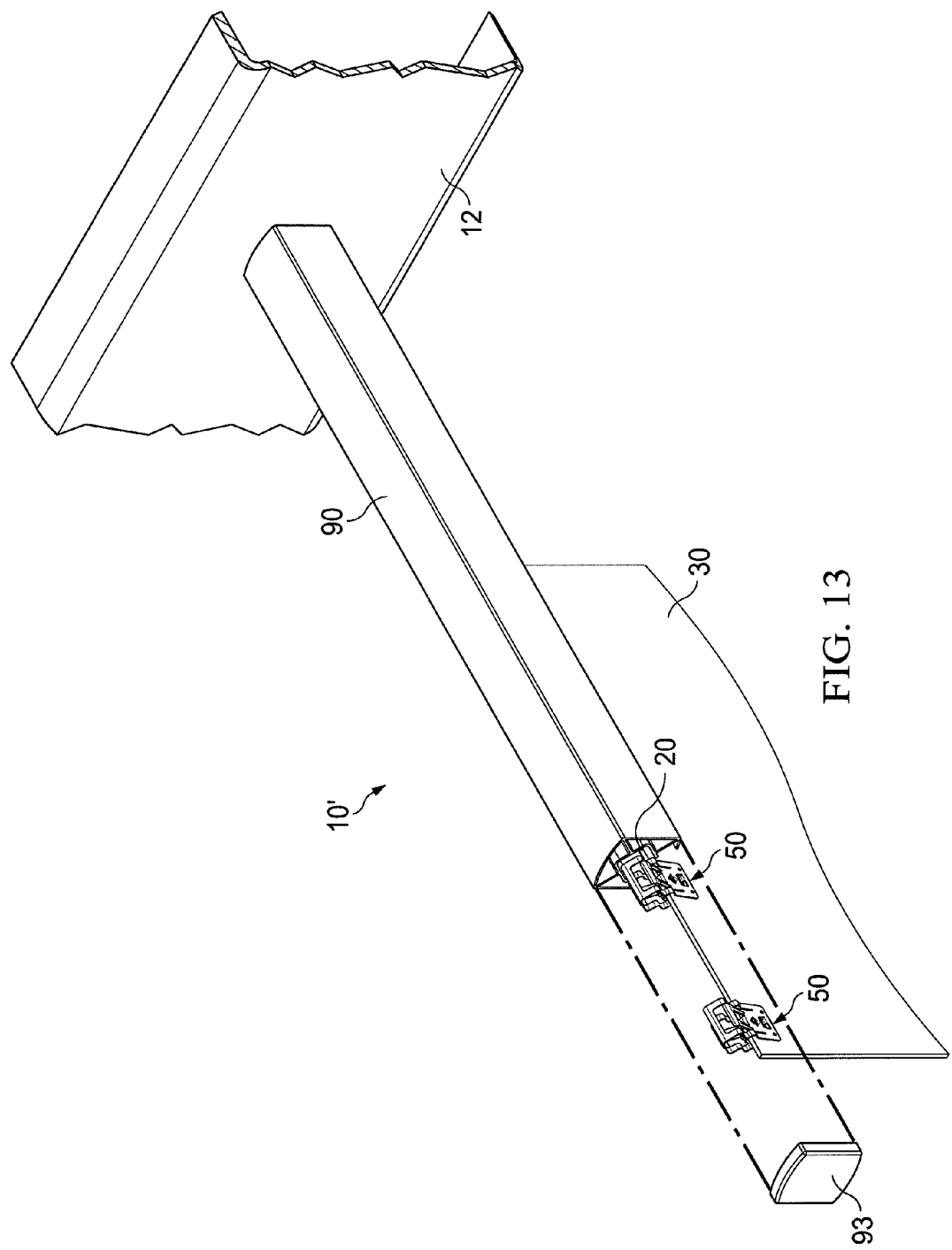
FIG. 13 is an exploded view of the embodiment illustrated in FIG. 12.
Figure 14:
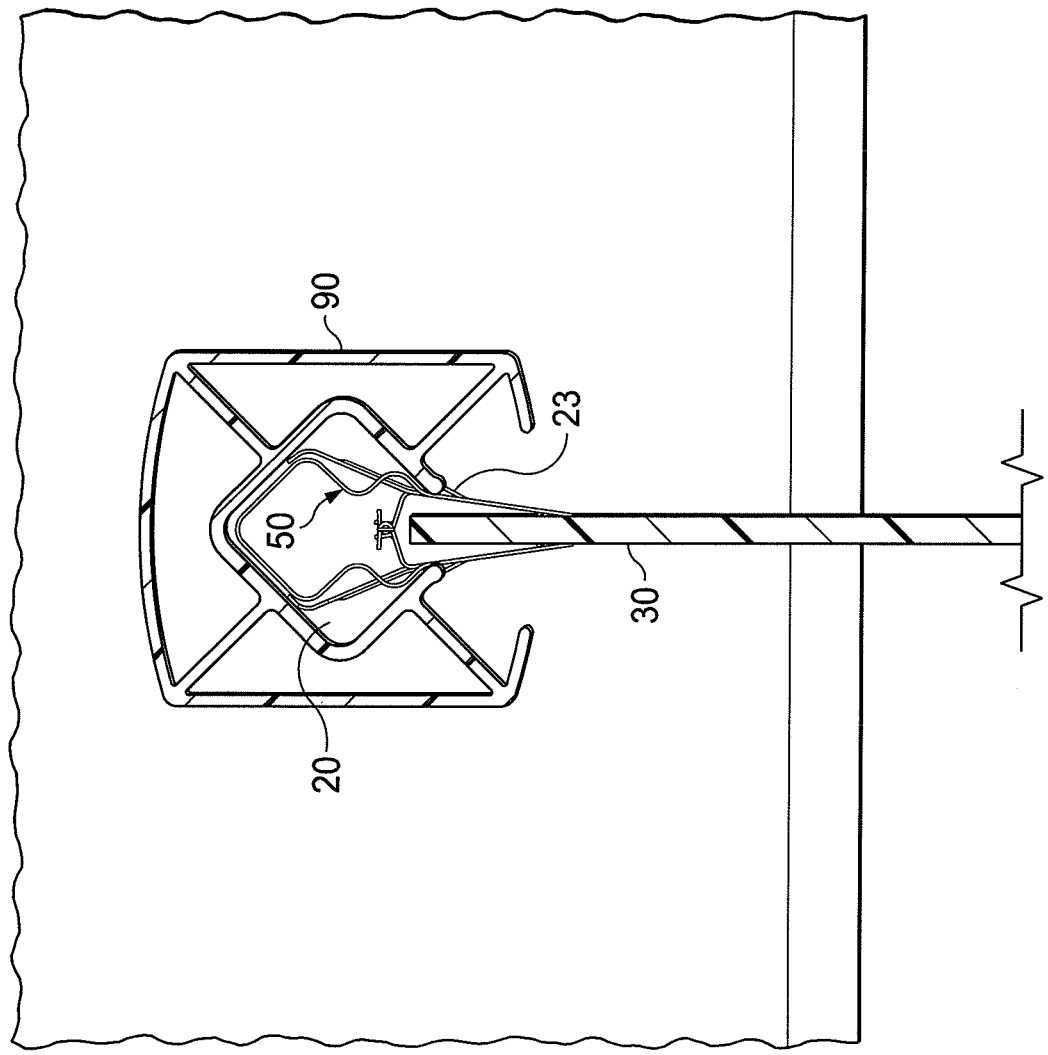
FIG. 14 is a section view as indicated of the embodiment illustrated in FIG. 12.

Yet another embodiment is shown in FIG. 12 through 14 wherein mounting arm 10' comprises an elongated chamber 20, defined by a tubular member 90 having an open outward end 92 and a bottom slot 23. A mud flap 30 is installed in this variant by attaching the clips 50 and then inserting the clipped top edge 40 into the chamber 20 and inserting the lower portion of the mud flap 30 into the bottom slot 23, and sliding the mud flap 30 through the chamber 20 and the slot 23 until the flap 30 is enclosed. To shield the chamber 20 from debris, an end cap 93 may be installed.

A mounting assembly for vehicle mud flaps has been described above with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

I claim:

1. A vehicle mud flap mounting assembly comprising:
   a mud flap having a top edge, and front and rear faces;
   an elongated mounting arm defining an elongated chamber along its length and having a slot opening in said chamber extending along the underside of said mounting arm and having a width slot defined by opposing lips; and
   one or more suspension clips, each of said clips comprising two or more opposing lever members hingedly coupled together and sharing a common fulcrum, each of said lever members comprising a proximal end portion and a distal end portion, where the distal end portions are configured for engagement with said mud flap;
   a biasing member urging the distal end portions of the opposing lever members towards one another and into engagement with the mud flap;
   said distal end portions of the opposing lever members moving apart so as to disengage the mud flap when the proximal end portions of the opposing lever members are moved towards one another; and
   wherein said chamber encloses said one or more clips installed on said mud flap and said mud flap is suspended thereby through said slot with said one or more clips seated within said chamber along said opposing lips.

2. The assembly of claim 1, further comprising an elongated opening defined in the top of said mounting arm, and wherein said mud flap is inserted into said chamber through said opening.

3. The assembly of claim 1, wherein said elongated chamber further comprises an open end and wherein said one or more clips installed on said top edge is slidably inserted into said open end.

4. The assembly of claim 3, further comprising an end cap for covering said open end.

5. The assembly of claim 1, wherein said biasing member is integrally formed with both of said lever members.

6. The assembly of claim 1, wherein said each of said clips comprises protrusions extending away from each lever member such that said protrusions seat on said opposing lips and configured such that a sufficiently upward force acting on said protrusions causes the distal end portions of said opposing lever members to move apart so as to disengage the mud flap.

7. The assembly of claim 6, further comprising an elongated opening defined in the top of said mounting arm, and wherein said mud flap is inserted into said chamber through said opening.

8. The assembly of claim 6, wherein said elongated chamber further comprises an open end and wherein said one or more clips installed on said top edge is slidably inserted into said open end.

9. The assembly of claim 6 wherein each of the opposing lever members includes a trap extending towards an interior of the clip, each of said traps positioned adjacent to a protrusion with the protrusion positioned between the trap and the distal end portion of the lever member so that when the traps engage the opposing lips of the slot, the distal end portions of the opposing lever members are held in a position where the mud flap is disengaged.

10. The assembly of claim 9 wherein the biasing member is integrally formed with both of said lever members.

11. The assembly of claim 6 wherein said biasing member is integrally formed with both of said lever members.

12. The assembly of claim 6 wherein each of the opposing lever members includes a manual opening tab attached to and divergently extending away from the distal end portion of the lever member, where the distal end portions of the opposing lever members move apart so as to disengage the mud flap when the manual opening tabs of the opposing lever members are moved towards each other.

13. The assembly of claim 1, wherein said elongated chamber further comprises an open end and wherein said one or more clips installed on said top edge is slidably inserted into said open end.

14. The assembly of claim 1, further comprising first and second tabs extending toward one another from the distal end portions of said opposing lever members and inserted into holes defined in said mud flap.

15. The assembly of claim 14, wherein said each of said clips comprises protrusions extending away from each lever member such that said protrusions seat on said opposing lips and configured such that a sufficiently upward force acting on said protrusions causes the distal end portions of said opposing lever members to move apart so as to disengage the mud flap.

16. A vehicle configured with mud flaps, said vehicle comprising:
  a vehicle frame on which to mount a mud flap mounting assembly;
  a mud flap mounting assembly attached to said vehicle frame to suppress spray caused by rotation of a vehicle wheel, said mud flap mounting assembly comprising:
    an elongated mounting arm defining an elongated chamber along its length and having a slot opening in the bottom of said chamber said slot having a width slightly greater than the thickness of a mud flap such that a mud flap may be inserted therein, said slot defined by opposing lips; and
    one or more suspension clips, each of said clips comprising two or more opposing lever members sharing a common fulcrum, each of said lever members comprising a proximal end portion and a distal end portion, where the distal end portions of said lever members are configured for removable attachment to a mud flap top edge,
    a biasing member urging the distal end portions of the opposing lever members towards one another and into engagement with the mud flap top edge;
    each of said clips comprising protrusions extending away from said opposing lever members to a width greater than the width of said slot, said protrusions configured to transform an upward force thereon to a leverage sufficient to force the distal end portions of said opposing lever members apart so as to disengage the mud flap top edge.

17. The assembly of claim 16, wherein said elongated chamber further comprises an open end and wherein said one or more clips installed on said top edge is slidably inserted into said open end.

18. The vehicle of claim 16, further comprising an elongated opening defined in the top of said mounting arm.

19. The vehicle of claim 18, wherein said elongated chamber further comprises an open end laterally outward from the vehicle frame.

20. The vehicle of claim 16 wherein each of the opposing lever members includes a trap extending towards an interior of the clip, each of said traps positioned adjacent to a protrusion with the protrusion positioned between the trap and the distal end portion of the lever member so that when the traps engage the opposing lips of the slot, the distal end portions of the opposing lever members are held in a position where the mud flap is disengaged.

21. The vehicle of claim 20 wherein said biasing member is integrally formed with both of said lever members.

22. The vehicle of claim 16 wherein said biasing member is integrally formed with both of said lever members.

23. The vehicle of claim 16 wherein each of the opposing lever members includes a manual opening tab attached to and divergently extending away from the distal end portion of the lever member, where the distal end portions of the opposing lever members move apart so as to disengage the mud flap when the manual opening tabs of the opposing lever members are moved towards each other.

24. The vehicle of claim 18 further comprising a removable lid for covering said opening.

25. A vehicle mud flap mounting assembly comprising:
  a mud flap having a top edge, and front and rear faces;
  an elongated mounting arm defining an elongated chamber along its length and having a slot opening in said chamber extending along the underside of said mounting arm and having a width slot defined by opposing lips;
  one or more suspension clips, each of said clips comprising two or more opposing lever members hingedly coupled together and sharing a common fulcrum, said lever members comprising contact surfaces configured for engagement with said front and rear faces along said top edge such that mud flap may be suspended thereby, each of clips comprising a width greater than the width of said slot;
  wherein said chamber encloses said one or more clips installed on said top edge and said mud flap is suspended thereby through said slot with said one or more clips seated within said chamber along said opposing lips;
  an elongated opening defined in the top of said mounting arm, and wherein said mud flap is inserted into said chamber through said opening; and
  a removable lid for covering said opening.

* * * * *